United States Patent
Colson et al.

(10) Patent No.: US 10,035,225 B2
(45) Date of Patent: Jul. 31, 2018

(54) THRUST PLATE INCLUDING COOLING SLOTS

(71) Applicant: HAMILTON SUNDSTRAND CORPORATION, Windsor Locks, CT (US)

(72) Inventors: Darryl A. Colson, West Suffield, CT (US); Craig M. Beers, Wethersfield, CT (US); John H. Paliulis, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 318 days.

(21) Appl. No.: 14/799,792

(22) Filed: Jul. 15, 2015

(65) Prior Publication Data

US 2015/0314404 A1 Nov. 5, 2015

Related U.S. Application Data

(62) Division of application No. 13/859,514, filed on Apr. 9, 2013, now Pat. No. 9,109,625.

(51) Int. Cl.
| | |
|---|---|
| *B23P 15/00* | (2006.01) |
| *F16C 37/00* | (2006.01) |
| *F16C 17/04* | (2006.01) |
| *F16C 33/10* | (2006.01) |

(52) U.S. Cl.
CPC ............ *B23P 15/003* (2013.01); *F16C 17/04* (2013.01); *F16C 33/1065* (2013.01); *F16C 37/00* (2013.01); *Y10T 29/49645* (2015.01); *Y10T 29/49647* (2015.01)

(58) Field of Classification Search
CPC ...... F04D 17/12; F04D 29/057; F04D 29/584; F16C 37/002; F16C 17/04; F16C 33/1065; B23P 15/003; Y10T 29/49696
See application file for complete search history.

(56) References Cited

U.S. PATENT DOCUMENTS

| | | | |
|---|---|---|---|
| 5,014,518 A | 5/1991 | Thomson et al. | |
| 5,602,945 A | 2/1997 | Carter | |
| 5,676,230 A | 10/1997 | Awaji et al. | |
| 6,288,817 B2 | 9/2001 | Rowe | |
| 8,784,048 B2 * | 7/2014 | Beers | F04D 19/002 415/180 |

(Continued)

FOREIGN PATENT DOCUMENTS

| | | |
|---|---|---|
| CN | 102562676 A | 7/2012 |
| JP | 5686228 A | 7/1981 |
| JP | 6288817 A | 4/1987 |

OTHER PUBLICATIONS

Chinese Office Action for 201410140511.3, dated Jan. 20, 2017, 8 pages (Translation Attached).

*Primary Examiner* — Jacob Cigna

(74) *Attorney, Agent, or Firm* — Cantor Colburn LLP

(57) ABSTRACT

A thrust plate includes an annular-shaped body having a scalloped outer edge that forms a first circumference defined by a first diameter. The thrust plate further includes a plurality of cooling slots formed in a first surface of the body. The cooling slots are formed between each pair of adjacent scallops. A center of each cooling slot extends towards the center of the thrust plate at a common predetermined angle with respect to one another.

9 Claims, 5 Drawing Sheets

(56) References Cited

U.S. PATENT DOCUMENTS

| | | | |
|---|---|---|---|
| 2009/0260388 A1* | 10/2009 | Nakazeki | F16C 19/54 62/402 |
| 2012/0017617 A1 | 1/2012 | Beers et al. | |
| 2012/0051957 A1 | 3/2012 | Beers et al. | |
| 2012/0155790 A1 | 6/2012 | Hattori et al. | |
| 2012/0156014 A1* | 6/2012 | Beers | F04D 19/002 415/180 |

* cited by examiner

TAKEN ALONG LINE A-A'

THRUST PLATE INCLUDING COOLING SLOTS

CROSS-REFERENCE TO RELATED APPLICATIONS

This application is a division of U.S. patent application Ser. No. 13/859,514, filed Apr. 9, 2013, the disclosure of which is incorporated by reference herein in its entirety.

BACKGROUND

The present inventive concept relates generally to an air cycle machine, and more specifically, to a thrust plate included in a bearing cooling system of an air cycle machine.

Performance and reliability of a conventional air cycle machine depends on providing proper cooling to one or more thrust bearings included in the air cycle machine's bearing cooling system. The thrust bearing supports a rotating assembly included in the bearing cooling system. A thrust plate is provided in the air cycle machine to support the thrust bearing and maintain the axial position of the rotating assembly. As the rotating assembly rotates, the thrust bearing may realize an increase in heat. Therefore, the conventional air cycle machine consists only of vents formed in a containment ring of the air cycle machine housing to flow cool to the thrust bearing.

SUMMARY

According to one embodiment of the present inventive concept, a thrust plate includes an annular-shaped body having a scalloped outer edge that forms a first circumference defined by a first diameter. The thrust plate further includes a plurality of cooling slots formed in a first surface of the body. The cooling slots are formed between each pair of adjacent scallops. A center of each cooling slot extends towards the center of the thrust plate at a common predetermined angle with respect to one another.

According to another embodiment, a method of forming cooling slots in a thrust plate comprises defining a horizontal axis that extends radially from a center of the thrust plate. The method further includes defining a vertical axis that extends radially from the center of the thrust plate, the vertical axis being perpendicular to the horizontal axis. The method further includes defining a plurality of leader axes that extend radially from the center of the thrust plate. The plurality of leader axes are off-set from at least one of the horizontal and vertical axes by a predetermined angle. The method further includes forming a plurality of slot groupings on a surface of the thrust plate based on the plurality of leader axes.

BRIEF DESCRIPTION OF THE SEVERAL VIEWS OF THE DRAWINGS

The subject matter which is regarded as the inventive concept is particularly pointed out and distinctly claimed in the claims at the conclusion of the specification. The forgoing and other features of the inventive concept are apparent from the following detailed description taken in conjunction with the accompanying drawings in which:

DETAILED DESCRIPTION

Figure 1:
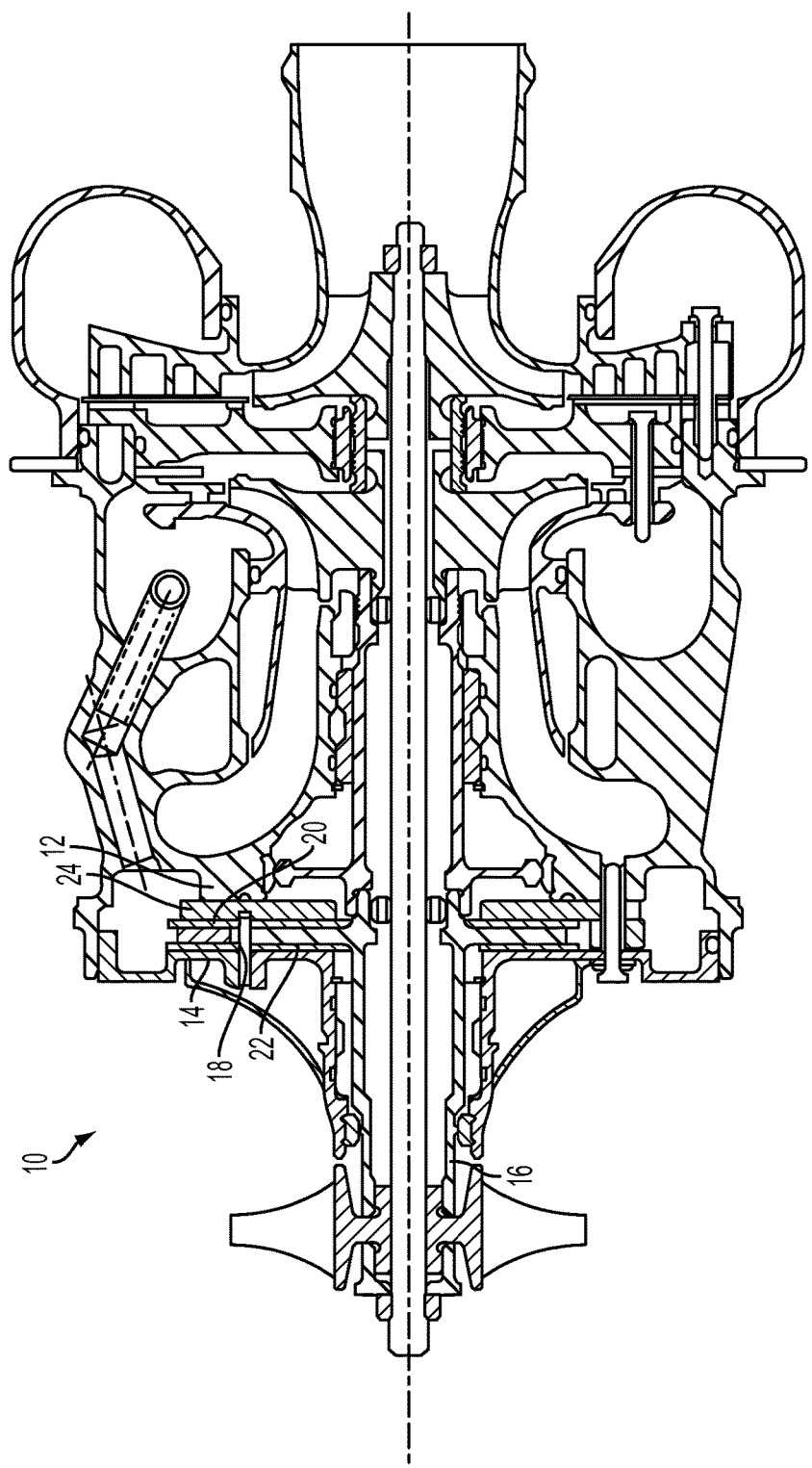
FIG. 1 is a cross-sectional view of an air cycle machine according to an embodiment.

Referring to FIG. 1, an air cycle machine (ACM) 10 is illustrated according to an embodiment. The ACM 10 includes turbine housing 12 and a bearing housing 14. A rotatable shaft 16 extends through the turbine housing 12 and the bearing housing 14 to drive one or more systems of the ACM. The shaft 16 is supported by a first thrust bearing 18 and a second thrust bearing 20. One or more vents may be formed in the bearing housing to introduce cool air to the thrust bearings 18, 20. A thrust runner 22 extends radially outwardly from the shaft 16 to provide extra support thereto. A thrust plate 24 is disposed against one side of the second thrust bearing 20 to maintain the first and second thrust bearings 18, 20 in place. The thrust plate 24 further includes a plurality of cooling slots to receive air flow. When mounted, the plurality of cooling slots formed on the thrust plate 24 may align with a respective slot formed on a cooling ring of the ACM 10 to form air flow channels that increase the airflow introduced to the thrust bearings 18, 20.

Figure 2:
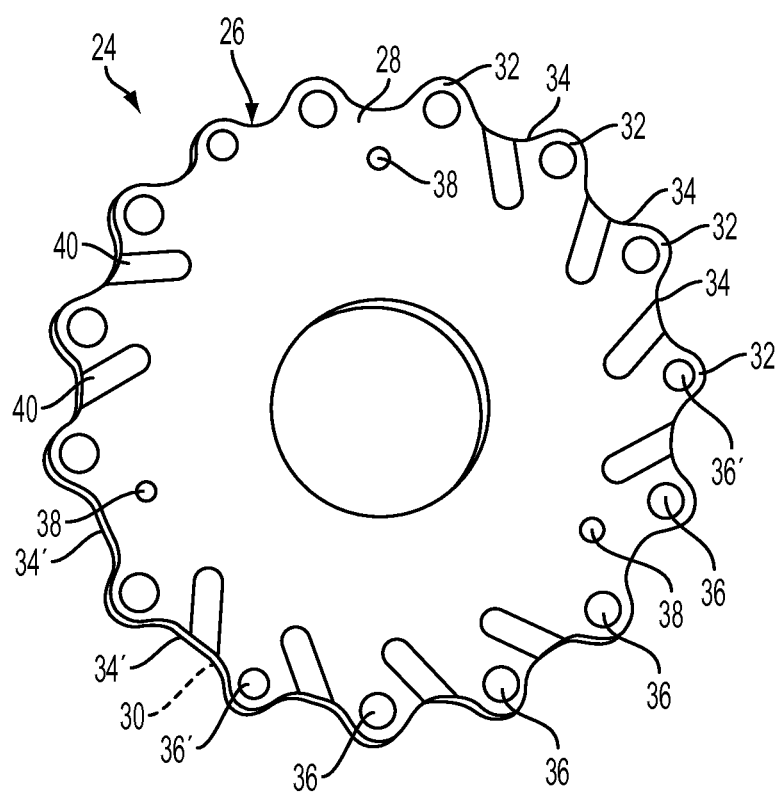
FIG. 2 illustrates a thrust plate according to at least one embodiment.

Referring now to FIG. 2, a thrust plate 24 is illustrated according to an embodiment. The thrust plate 24 includes an annular shaped body 26 having a first surface 28 and a second surface 30 opposite the first surface. The body 26 includes a scalloped outer edge, which reduces the overall weight of the thrust plate 24. The scalloped outer edge forms a first circumference defined by a first diameter being approximately 3.860 inches (approximately 9.804 cm) and an inner edge forming a second circumference defined by diameter being approximately 1.218 inches (approximately 3.094 cm). The scalloped outer edge defines a plurality of curved scallops 32, i.e., projections, spaced apart from one another by a gap 34. At least three of the gaps are sized larger than the remaining gaps 34 to define an alignment gap 34', which positions the thrust plate 24 at a predetermined orientation when the thrust plate 24 is coupled to the turbine housing and the bearing housing.

Each individual scallop 32 includes an outer eyelet 36 formed therethrough. In at least one embodiment, a first plurality of the outer eyelets 36 has a first eyelet diameter of approximately 0.170 inches (approximately 0.432 cm) to receive a respective first bolt, which couples a first portion of the thrust plate to the turbine housing of the ACM 10. A second plurality of the outer eyelets 36' has a second eyelet diameter of approximately 0.145 inches (approximately 0.368 cm). The second diameter receives a respective second bolt to couple a second portion of the thrust plate 24 to the bearing housing of the ACM 10. The alignment gaps 34' assist in positioning the thrust plate 24 at a predetermined orientation when coupled to the turbine housing and the bearing housing via the bolts. That is, the alignment gaps 34' assisting in preventing the thrust plate 24 from being improperly assembled. The thrust plate 24 further includes a plurality of alignment holes 38 to receive a respective pin to be disposed therethrough. Each alignment hole 38 is formed adjacent a respective gap 34 to further promote the alignment of the thrust plate 24 with respect to the turbine housing and the thrust bearing housing.

The thrust plate 24 further includes by a plurality of cooling slots 40 formed in the first surface 28. In at least one embodiment illustrated in FIG. 2, the thrust plate 24 includes 10 cooling slots 40 arranged according to a plurality of slot groupings. In at least one embodiment, first and second slot groupings each consist of four cooling slots 40 and a third slot grouping consists of two cooling slots 40. Each cooling slot 40 is formed between a pair of adjacent scallops 32 and extends between an open end formed at the outer edge of the thrust plate 24 and a curved end. Each cooling slot 40 has a length ranging from approximately 0.762 cm (approximately 0.3 inches) to approximately 1.016 cm (approximately 0.4 inches). Further, each cooling slot 40 has a width (w) ranging from approximately 0.394 cm (approximately 0.155 inches) to approximately 0.149 cm (approximately 0.165 inches) and thickness ($w_{th}$) ranging from approximately 0.152 cm (0.06 inches) to approximately 0.178 cm (0.07 inches). A center axis ($A_S$) of each cooling slot 40 included in respective slot grouping forms a predetermined angle ($\theta_{AXIS}$) with respect to the center axis of an adjacent cooling slot 40, as discussed in greater detail below. In at least one embodiment, the predetermined angle is approximately 24.00 degrees.

Figure 3A:
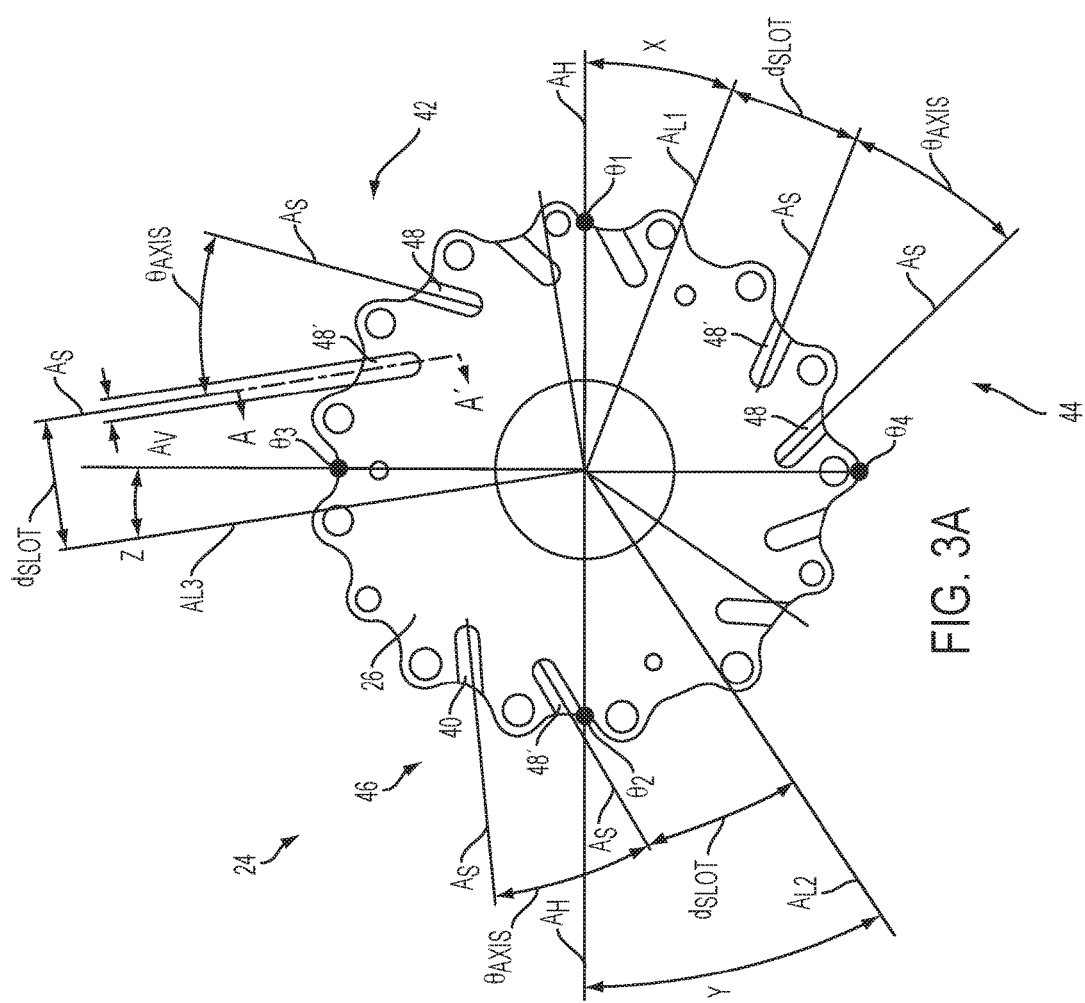
FIGS. 3A-3C are diagrams illustrating dimensions of the thrust plate illustrated in FIG. 2 according to various embodiments.
Figure 3B:
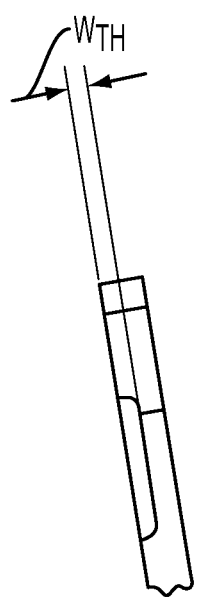
Figure 3C:
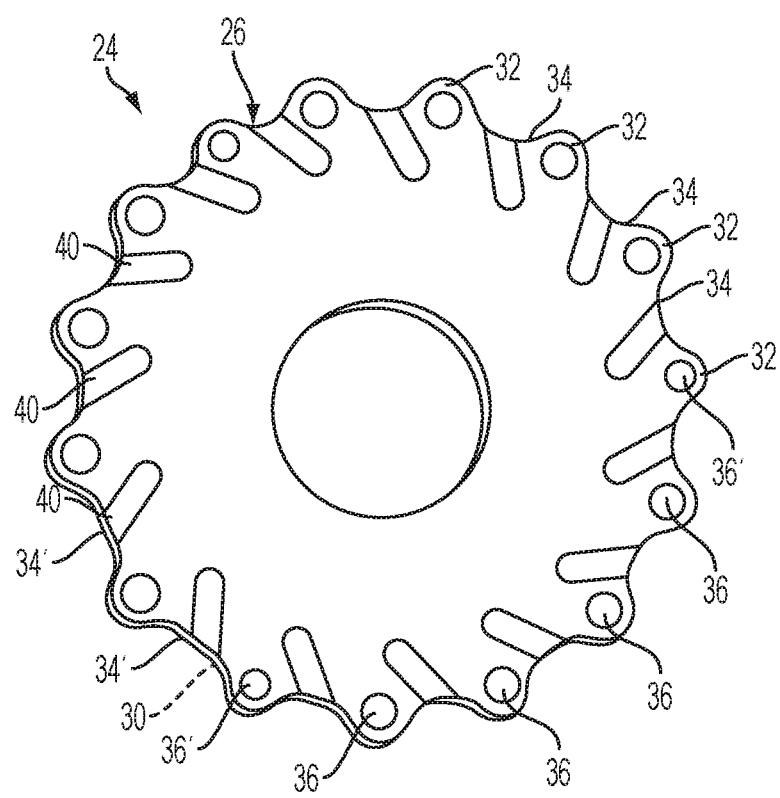

The location of the cooling slots 40 may be formed on the thrust plate 24 according to a plurality axes extending across the surface of the body 26. Referring to FIGS. 3A-3C, a horizontal axis ($A_H$) and a vertical axis ($A_V$) extend across the body 26. The horizontal axis ($A_H$) extends through a center of the thrust plate 24 and between a first horizontal point ($\theta_1$) and a second horizontal point ($\theta_2$). The first horizontal point ($\theta_1$) is located at approximately 0 degrees with respect to the circumference of the outer edge. The second horizontal point ($\theta_2$) is located at the outer edge approximately 180 degrees with respect to the first horizontal point, i.e., 180 degrees from the 0 degrees point. The vertical axis ($A_V$) extends through the center of the thrust plate 24 and between a first vertical point ($\theta_3$) and a second vertical point ($\theta_4$). The first vertical point ($\theta_3$) is located at the outer edge approximately 90 degrees with respect to the first and second horizontal points ($\theta_1$), ($\theta_2$), i.e., 0 degrees and 270 degrees, respectively. The second vertical point ($\theta_4$) is located at the outer edge at approximately 270 degrees with respect to the first and second horizontal points ($\theta_1$), ($\theta_2$).

A plurality of leader axes are defined based on the horizontal and vertical axes ($A_H$), ($A_V$). The plurality of leader axes include a first leader axis ($A_{L1}$), a second leader axis ($A_{L2}$), and a third leader axis ($A_{L3}$). The first leader axis ($A_{L1}$) is off-set at in a clock-wise direction at a first angle (X) with respect to the first horizontal point (i.e., 0 degrees) of the horizontal axis. A second leader axis ($A_{L2}$) is off-set in a counter-clockwise direction at a second angle (Y) with respect to the second horizontal point (i.e., 180 degrees) of the horizontal axis. The third leader axis ($A_{L3}$) is off-set in a counter-clockwise direction at a third angle (Z) with respect to the first vertical point (i.e., 90 degrees) of the vertical axis. In at least one embodiment, the first angle (X) is approximately 21.00 degrees, the second angle (Y) is approximately 30.00 degrees and the third angle (Z) is approximately 9.00 degrees.

The plurality of slot groupings are arranged on the thrust plate 24 based on a respective leader axis. More specifically, a first slot grouping 42 is arranged on the thrust plate 24 based on the first leader axis ($A_{L1}$), a second slot grouping 44 is arranged on the thrust plate 24 based on the second leader axis ($A_{L2}$), and a third slot grouping 46 is arranged on the thrust plate 24 based on the third leader axis ($A_{L3}$). Each slot grouping includes a lead cooling slot 48, which is the basis for arranging the remaining cooling slots 40 in the respective slot grouping. The lead cooling slot 48 is spaced a predetermined distance ($d_{SLOT}$) away from a respective lead axis. In at least one embodiment, each lead cooling slot 48 is spaced approximately 0.915 inches (approximately 2.324 cm) away from a respective lead axis in the clock-wise direction.

Referring to the first slot grouping 42, a first lead cooling slot 48 is formed on the thrust plate 24 such that a center axis ($A_S$) extends through the center of the lead cooling slot 48 is approximately 0.915 inches away from the first leader axis ($A_{L1}$). The three remaining cooling slots 40 of the first slot grouping 42 are formed such that the respective center axes ($A_S$) of each cooling slot 40 have an angle of approximately 24.00 degrees with respect to one another.

Referring to the second slot grouping 44, a second lead cooling slot 48' is formed on the thrust plate 24 such that the center axis ($A_S$) is approximately 0.915 inches away from the second leader axis ($A_{L2}$). The three remaining cooling slots 40 of the second slot grouping 42 are formed such that the respective center axes ($A_S$) of each cooling slot 40 have an angle of approximately 24.00 degrees with respect to one another.

Referring finally to the third slot grouping 46, a third lead cooling slot 48" is formed on the thrust plate 24 such that the center axis ($A_S$) is approximately 0.915 inches away from the third leader axis ($A_{L3}$). Accordingly, the remaining cooling slot 40 of the third slot grouping 46 is formed such that the respective center axis ($A_S$) has an angle of approximately 24.00 degrees with respect to the third lead cooling slot ($A_{L3}$).

While various embodiments of the inventive concept had been described, it will be understood that those skilled in the art, both now and in the future, may make various modifications to the embodiments which fall within the scope of the claims which follow. These claims should be construed to maintain the proper protection for the invention first described.

What is claimed is:

1. A method of forming cooling slots in a thrust plate, the method comprising:
   defining a horizontal axis that extends radially from a center of the thrust plate;
   defining a vertical axis that extends radially from the center of the thrust plate, the vertical axis being perpendicular to the horizontal axis;
   defining a plurality of leader axes that extend radially from the center of the thrust plate, the plurality of leader axes being off-set from at least one of the horizontal and vertical axes by a first predetermined angle;
   forming a plurality of slot groupings on a first surface of a body of the thrust plate based on the plurality of leader axes,
   wherein forming the plurality of slot groupings further comprises forming a plurality of cooling slots in the first surface, the body having a scalloped outer edge that defines a plurality of curved scallops defining a gap between each individual scallop, each cooling slot formed between a pair of adjacent scallops such that a center of each cooling slot extends toward a center of the thrust plate at a common second predetermined angle with respect to one another.

2. The method of claim 1, wherein the defining a horizontal axis includes extending the horizontal axis through a first horizontal point located at point of 0 degrees with respect to a circumferential outer edge of the thrust plate, and second horizontal point located approximately 180 degrees with respect the first horizontal point.

3. The method of claim 2, wherein the defining a vertical axis includes extending the vertical axis through a first vertical point located approximately 90 degrees with respect to the first horizontal point, and a second vertical point located 270 degrees with respect to the first horizontal point.

4. The method of claim 3, wherein the defining a plurality of leader axes includes defining a first leader axis off-set at a first predetermined angle in clock-wise direction with respect to the first horizontal point, a second leader axis off-set at a second predetermined angle different from the first predetermined angle in a counter-clockwise direction with respect to the second horizontal point, and a third leader axis of set at a third predetermined angle different from the first and second predetermined angles, the third predetermined angle off-set-in a counter-clockwise direction with respect to the first vertical point.

5. The method of claim 4, wherein the forming the forming a plurality of slot groupings further comprises forming a plurality of cooling slots according to a respective slot grouping.

6. The method of claim 5, wherein the forming a plurality of slot groupings includes forming a first slot grouping on the thrust plate based on the first leader axis, forming a second slot grouping on the thrust plate based on the second leader axis, and forming a third slot grouping on the thrust plate based on the third leader axis.

7. The method of claim 6, further comprising forming the cooling slots in each slot grouping such that the center of the cooling slots in a respective group is angled at a common angle with respect to one another.

8. The method of claim 7, wherein a center of at least one cooling slot in each slot grouping is spaced from a respective lead axis by 0.915 inches.

9. The method of claim 8, wherein the first predetermined angle is 21.00 degrees, the second predetermined angle is 30.00 degrees and the third predetermined angle is 9.00 degrees.

* * * * *